United States Patent
Suzuki

(10) Patent No.: US 9,239,885 B2
(45) Date of Patent: Jan. 19, 2016

(54) ACQUIRING DATA FOR PROCESSING USING LOCATION INFORMATION

(71) Applicant: CANON KABUSHIKI KAISHA, Tokyo (JP)

(72) Inventor: Takeshi Suzuki, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/338,147

(22) Filed: Jul. 22, 2014

(65) Prior Publication Data

US 2015/0043038 A1 Feb. 12, 2015

(30) Foreign Application Priority Data

Aug. 12, 2013 (JP) .................................. 2013-167846

(51) Int. Cl.
*G06F 17/30* (2006.01)
*G06F 3/12* (2006.01)
*G06K 15/02* (2006.01)

(52) U.S. Cl.
CPC ............ *G06F 17/3089* (2013.01); *G06F 3/122* (2013.01); *G06F 3/1212* (2013.01); *G06F 3/1241* (2013.01); *G06F 3/1265* (2013.01); *G06F 3/1285* (2013.01); *G06F 3/1244* (2013.01); *G06F 3/1271* (2013.01); *G06F 2206/1514* (2013.01); *G06K 15/1827* (2013.01)

(58) Field of Classification Search
CPC ..... G06F 3/122; G06F 3/1271; G06F 3/1244; G06F 17/3089

USPC ................................................ 358/1.16, 1.15
See application file for complete search history.

(56) References Cited

U.S. PATENT DOCUMENTS

| | | |
|---|---|---|
| 2011/0320408 A1 | 12/2011 | Grosse |
| 2012/0026542 A1 | 2/2012 | Kobayashi |
| 2013/0046860 A1* | 2/2013 | Yamagishi et al. ............ 709/219 |
| 2013/0163017 A1* | 6/2013 | Matsuda ....................... 358/1.13 |
| 2014/0168692 A1* | 6/2014 | Nishikawa .................... 358/1.15 |
| 2014/0185087 A1* | 7/2014 | Hayashi ....................... 358/1.15 |

FOREIGN PATENT DOCUMENTS

| | | |
|---|---|---|
| EP | 1 052 827 | 11/2000 |
| JP | 2012-18528 | 1/2012 |

OTHER PUBLICATIONS

European Search Report dated Dec. 19, 2014 issued during prosecution of related European application No. 14002557.8.
European Search Report issued Jun. 9, 2015 during prosecution of related European application No. 14002557.8.

* cited by examiner

*Primary Examiner* — Jacky X Zheng

(74) *Attorney, Agent, or Firm* — Fitzpatrick, Cella, Harper & Scinto

(57) ABSTRACT

An information processing apparatus generates first location information about a location of at least a part of data as a target of predetermined processing and second location information about a location of location information corresponding to a part different from the part, and transmits the generated first and second location information to a processing apparatus which executes the predetermined processing for the data.

18 Claims, 8 Drawing Sheets

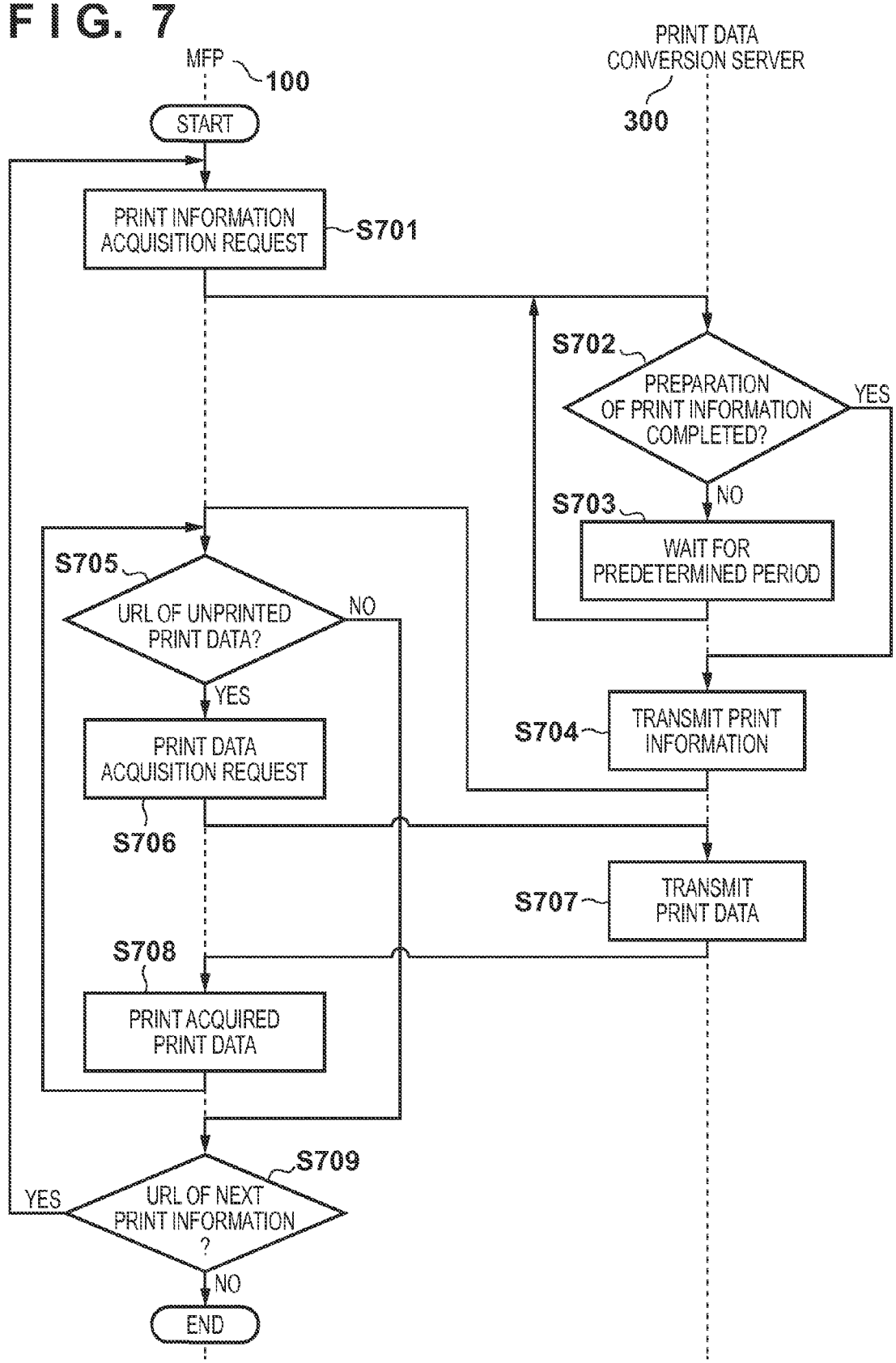

FIG. 8

```
<?xml version="1.0" encoding="utf-8" ?>
<contentslist xlmns="http://www.XXX.com/list">

<mediasize>A4</mediasize>
        <mediatype>plain</mediatype>
            ⋮
        <copies>1</copies>
        <object>
            <front>
                <url>http://www.XXX.com/YYY_1pagefront.jpg</url>
                <filesize>44444</filesize>
            </front>
        </object>
                                                              } 801

<mediasize>A4</mediasize>
        <mediatype>plain</mediatype>
            ⋮
        <copies>1</copies>
        <object>
            <front>
                <url>http://www.XXX.com/YYY_2pagefront.jpg</url>
                <filesize>11111</filesize>
            </front>
        </object>
                                                              } 802

<mediasize>A4</mediasize>
        <mediatype>plain</mediatype>
            ⋮
        <copies>1</copies>
        <object>
            <front>
                <url>http://www.XXX.com/YYY_3pagefront.jpg</url>
                <filesize>33333</filesize>
            </front>
            <back>
                <url>http://www.XXX.com/ YYY_3pageback.jpg</url>
                <filesize>77777</filesize>
            </back>
        </object>
                                                              } 803
    <next_contentslist>
        <url>http://www.XXX.com/YYY_2contentslist.xml</url>
        <filesize>2222</filesize>                                    } 804
    </next_contentslist>
</contentslist>
```

ACQUIRING DATA FOR PROCESSING USING LOCATION INFORMATION

BACKGROUND OF THE INVENTION

1. Field of the Invention

The present invention relates to a technique of processing process target data based on its location information.

2. Description of the Related Art

In recent years, a print apparatus has a function of, for example, receiving a notification of existence of a print job from a server via a network, acquiring the print job from the server, and printing it. At this time, the print job is, for example, notified from a terminal apparatus located in a place far apart from the print apparatus to the server via the Internet and then notified from the server to the print apparatus. Finally, the print apparatus that has received the notification acquires print data from the server and executes printing. Japanese Patent Laid-Open No. 2012-018528 describes a print apparatus that receives a notification of a print job from a digital TV and acquires print data using a URL representing the location of print content data (print data) included in the notification.

However, in, for example, an inexpensive print apparatus whose RAM has a small memory capacity, the capacity of a buffer configured to receive associated information including the location of print data and the like may be limited. For this reason, when the associated information of print data has a size larger than the buffer capacity of the print apparatus, the data amount exceeds the buffer capacity of the print apparatus, and the apparatus may be unable to receive whole information.

The present invention has been made in consideration of the above problem, and provides a technique capable of appropriately processing process target data even when the buffer capacity of a processing apparatus is small.

SUMMARY OF THE INVENTION

According to one aspect of the present invention, there is provided an information processing apparatus comprising: generation unit configured to generate first location information about a location of at least a part of data as a target of predetermined processing and second location information about a location of location information corresponding to a part different from the part; and transmission unit configured to transmit the first location information and the second location information generated by the generation unit to a processing apparatus which executes the predetermined processing for the data.

According to another aspect of the present invention, there is provided a processing apparatus for executing predetermined processing, comprising: reception unit configured to receive, from another apparatus, first location information about a location of data as a target of the predetermined processing and second location information about a location of the first location information corresponding to another data; acquisition unit configured to acquire the data based on the first location information received by the reception unit and acquire the first location information corresponding to the other data based on the second location information received by the reception unit; and execution unit configured to execute the predetermined processing for the data acquired by the acquisition unit, wherein the acquisition unit acquires the first location information corresponding to the other data from the other apparatus based on the second location information, and acquires the other data based on the acquired first location information.

Further features of the present invention will become apparent from the following description of exemplary embodiments with reference to the attached drawings.

BRIEF DESCRIPTION OF THE DRAWINGS

FIG. 7 is a sequence chart showing an operation example of print processing; and FIG. 8 is a schematic view showing an example of print information.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

(System Arrangement)

Figure 1:
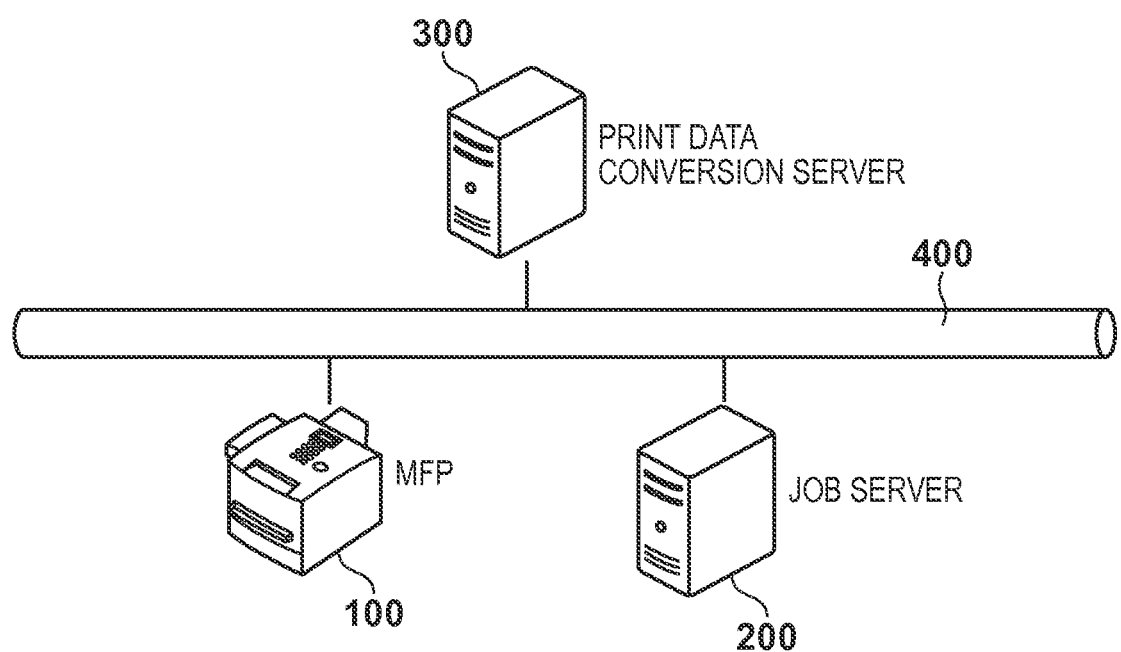
FIG. 1 is a view showing an example of the arrangement of a print system.

FIG. 1 is a view showing an example of the arrangement of a print system according to this embodiment. This print system includes, for example, a multifunction peripheral (MFP) 100, a job server 200, and a print data conversion server 300 which are connected to a communication network 400 such as the Internet or an intranet. The MFP 100 includes a print apparatus for executing print processing. The print data conversion server 300 includes an information processing apparatus for converting print target data into print data in a format printable by the MFP 100.

When connected to the communication network 400 for the first time, the MFP 100 communicates with the job server 200 and registers itself in the job server 200. By the registration, the MFP 100 and the job server 200 are associated with each other and can communicate with each other. At the time of registration, the job server 200 creates the default account of the MFP 100 and notifies the MFP 100 of it. The default account is used when the MFP 100 issues a print job using an application server (not shown).

Communication between the MFP 100, the job server 200, and the print data conversion server 300 is done using a communication protocol such as HTTP or XMPP, and a detailed description thereof will be omitted. Note that the job server 200, the print data conversion server 300, and the application server will be described as separate servers because provided functions are different. However, one server may include the plurality of functions.

(Arrangement of MFP 100)

Figure 2:
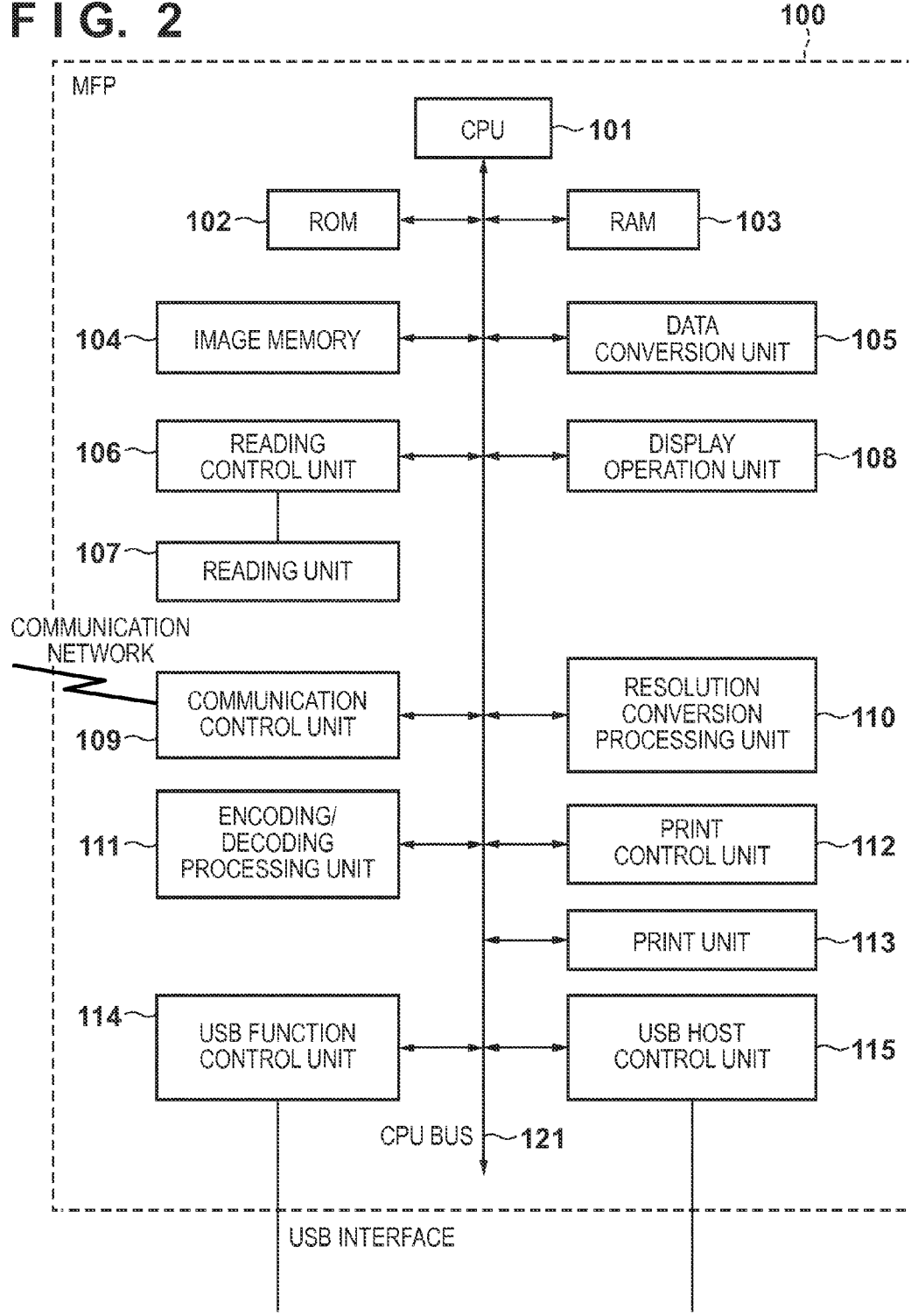
FIG. 2 is a block diagram showing an example of the arrangement of an MFP.

FIG. 2 is a block diagram showing an example of the schematic arrangement of the MFP 100 according to this embodiment.

Referring to FIG. 2, a CPU 101 is a control unit that controls the system, and controls the entire MFP 100. A ROM 102 stores permanent data such as a control program to be executed by the CPU 101, data tables, and a built-in operating system (OS) program. In this embodiment, software execution control of scheduling, task switch, interrupt processing, and the like is performed by the control program stored in the ROM 102 under the management of the built-in OS stored in the ROM 102.

A RAM 103 is formed from an SRAM (Static Random Access Memory) with a backup power supply, or the like, and holds data by a primary battery (not shown) for data backup. The RAM 103 stores program control variables and the like whose data should not be erased. The RAM 103 is also provided with a memory area for storing set values registered by the operator, management data of the MFP 100, and the like. An image memory 104 is formed from a DRAM (Dynamic Random Access Memory), or the like, and stores image data. A partial area of the image memory 104 is allocated as a work area to be used to execute software processing.

A data conversion unit 105 performs analysis of a PDL (Page Description Language) and image data conversion such as CG (Computer Graphics) rasterization of character data.

A reading control unit 106 performs various kinds of image processing such as binarization and halftoning for an image signal input from a reading unit 107 via an image processing control unit (not shown), and outputs high-resolution image data. The reading unit 107 optically reads an original using a CIS image sensor, converts the reading result into electrical image data, and generates an image signal. Note that the reading control unit 106 and the reading unit 107 can use either a sheet reading control method of reading an original using a fixed CIS image sensor while conveying the original or a book reading control method of scanning an original fixed on a platen by a moving CIS image sensor.

A display operation unit 108 is formed from keys such as numerical value input keys, mode setting keys, a decision key, and a cancel key, and an LED (Light Emitting Diode) or 7-segment display unit, and receives an activation operation of various functions of the MFP by the user. The display operation unit 108 also has a browser function and can operate as a general built-in browser.

A communication control unit 109 is connected to the communication network 400, and performs connection to an Internet provider or communicates data, image information, and the like with respect to the job server 200 or the print data conversion server 300.

A resolution conversion processing unit 110 performs resolution conversion control such as interconversion between millimeter-based image data and inch-based image data. Note that the resolution conversion processing unit 110 may execute image data enlargement/reduction processing. An encoding/decoding processing unit 111 executes encoding/decoding processing (for example, non-compression, MH, MR, MMR, JBIG, JPEG) or enlargement/reduction processing of image data to be handled by the MFP 100.

A print control unit 112 converts image data to be printed into high-resolution image data by performing various kinds of image processing such as smoothing, print density correction, and color correction via the image processing control unit (not shown), and outputs the image data to a print unit 113. The print control unit 112 also periodically acquires status information data of the print unit 113 by controlling a USB function control unit 114. The print unit 113 is formed from a laser beam printer, an inkjet printer, or the like, and executes print processing of color image data or monochrome image data generated by the print control unit 112 on a printing material.

The USB function control unit 114 is a functional unit that performs communication control of a USB interface, and executes protocol control based on the USB communication standard. The USB function control unit 114, for example, converts data from a USB function control task executed by the CPU 101 into a packet, and transmits it to an external PC (not shown). Conversely, the USB function control unit 114, for example, receives a USB packet from an external PC, converts it into data, and transmits it to the CPU 101. A USB host control unit 115 is a control unit configured to perform communication using a protocol defined by the USB communication standard. The USB communication standard is a standard capable of performing bi-directional data communication at a high speed. According to this standard, a plurality of hubs or functions (slaves) can be connected to one host (master). The USB host control unit 115 has the function of a host in USB communication. The above-described functional units are connected to each other via a CPU bus 121 managed by the CPU 101.

(Arrangement of Server)

Figure 3:
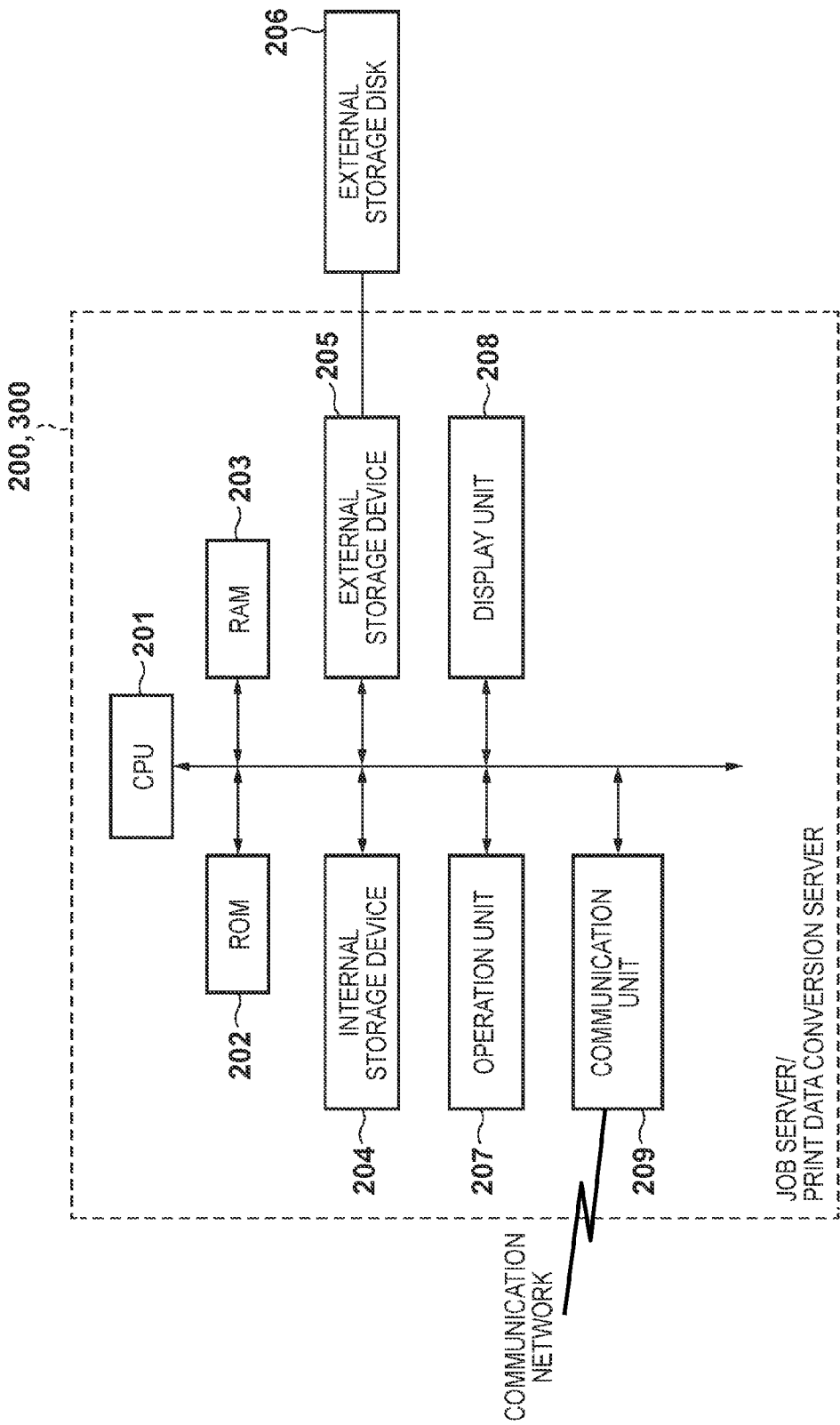
FIG. 3 is a block diagram showing an example of the arrangement of a job server and a print data conversion server.

FIG. 3 is a block diagram showing an example of the schematic arrangement of the job server 200 and the print data conversion server 300 according to this embodiment. The job server 200 and the print data conversion server 300 have the same arrangement as shown in FIG. 3 as an example.

Referring to FIG. 3, a CPU 201 controls the operation of the entire server via a system bus in accordance with programs read out from a ROM 202, a RAM 203, an internal storage device 204, or an external storage medium (disk) 206 by an external storage device 205. The ROM 202 stores the control program of the CPU 201, and the like. The RAM 203 is a storage device configured to temporarily store programs and image data and cause the server to operate at a high speed. The internal storage device 204 stores the operating system, various application programs, image data, and the like. Application software and the like configured to, for example, transmit/receive various control instructions and data to/from other apparatuses (for example, MFP 100 and other servers) are installed in the internal storage device 204. These pieces of application software are installed in the internal storage device 204 normally by receiving data from another computer-readable medium storing the software via the external storage disk 206 (for example, CD/DVD medium) and controlling the external storage device 205.

An operation unit 207 controls a keyboard and a mouse (none are shown) serving as an instruction input unit from the operator. A display unit 208 performs various kinds of display for the operator. A communication unit 209 is connected to the communication network 400, and performs connection to an Internet provider or communicates data, image information, and the like with respect to the MFP 100 or other servers.

(Operation of Print System)

In this embodiment, the print data conversion server 300 converts print target data into print data, and stores the print data in the storage unit of the print data conversion server 300 on a page basis when executing printing. At this time, the print data conversion server 300 generates print information including location information representing where print data corresponding to each page when executing printing exists, and stores the print information in the storage unit of the print data conversion server 300 as well.

At this time, the print data conversion server 300 decides whether to generate one piece of print information including the location information of print data of all pages when executing printing or generate a plurality of pieces of print information each including the location information of partial print data out of all pages when executing printing. This decision is executed in accordance with, for example, the storage capacity (buffer capacity) to store print information in the MFP 100. For example, the storage capacity to store print information in the MFP 100 is registered in the print data conversion server 300 in advance, and the decision is performed in accordance with the registered storage capacity. Alternatively, the print data conversion server 300 may be notified by the MFP 100 of information about the storage capacity and do the decision using the notified information. As the information to be notified from the MFP 100 to the print data conversion server 300, information representing the storage capacity may be used. Alternatively, model information representing the model of the MFP 100 may be notified, and the print data conversion server 300 may identify the storage capacity corresponding to the model.

In this embodiment, when there exist a plurality of print target pages, the plurality of pages are sometimes divided into a plurality of groups in accordance with the decision, and print information (for example, location information of print target data) corresponding to one or a plurality of pages included in each divided group is created. When generating print information corresponding to one or a plurality of pages divided into a group in this way, print information of each group includes information about print information of another group except print information including information about the last page when executing printing. That is, each print information includes information about another print information corresponding to pages after the pages to which the print information corresponds. Note that "division" here includes division executed after creation of print information for all print target pages is completed and division caused by sequentially creating print information for some of all print target pages.

Note that information about print information of another group is, for example, location information representing where the print information of another group exists in the print data conversion server 300. When information about another print information is included, print information of a group and print information of a group different from the group are linked. Since print data corresponding to the print information of the print target group and print data corresponding to the print information of the other group are linked, the MFP 100 can identify the print data as a series of data.

Figure 4:
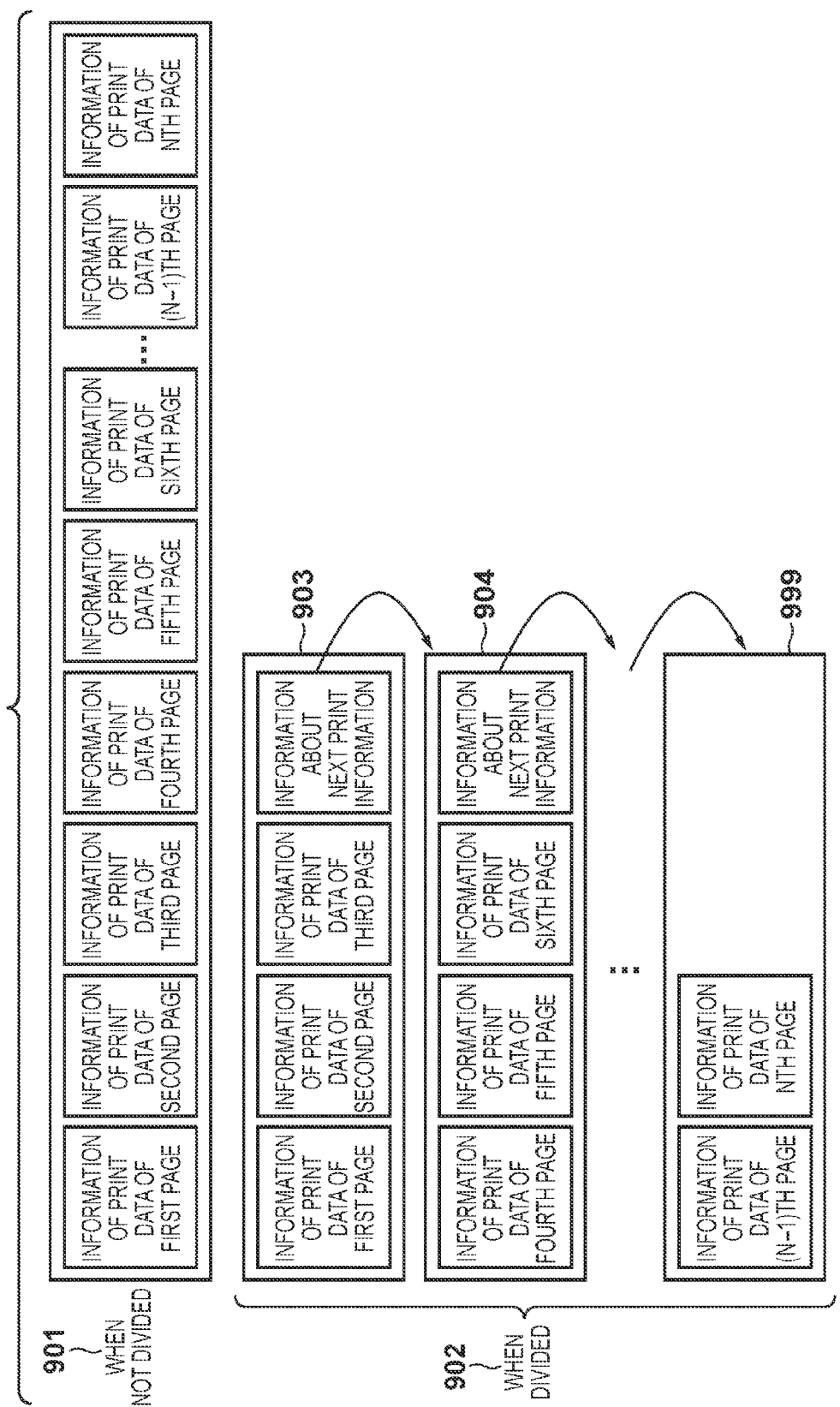
FIG. 4 is a view showing examples of print information.

FIG. 4 shows examples of print information generated in this way. Reference numeral 901 denotes a piece of print information generated in correspondence with all pages when executing printing without performing the above-described division. In this case, the print information is generated as one XML file including "information of print data of the first page" to "information of print data of the Nth page". In this case, however, the MFP 100 may be unable to receive the print information because the file size of the print information is large.

On the other hand, reference numeral 902 denotes print information generated by performing the above-described division and generating print information for each of the divided groups. Note that print information corresponding to each group is generated as an XML file. The XML file of each group corresponding to one or a plurality of pages includes print information (location information of print data) corresponding to the one page or each of the plurality of pages.

For example, first print information 903 in FIG. 4 includes "information of print data of the first page", "information of print data of the second page", "information of print data of the third page", and "information about next print information". Note that "information about next print information" of the print information 903 indicates print information 904 having information corresponding to the fourth page following pages 1 to 3 when executing printing corresponding to the print information 903. More specifically, "information about next print information" includes location information representing where the print information 904 is stored on the network. Hence, when acquiring the print information 903, the MFP 100 can acquire print data of pages 1 to 3 in accordance with the information corresponding to pages 1 to 3 and also acquire the location information of print data from the fourth page using "information about next print information".

The second print information 904 includes "information of print data of the fourth page", "information of print data of the fifth page", "information of print data of the sixth page", and "information about next print information". Print information 999 includes information of the last page (Nth page) when executing printing and therefore does not include "information about next print information".

When print information is generated for each of the groups into which the plurality of print target pages are divided, and provided to the MFP 100, the file size of print information to be transmitted to the MFP 100 at once can be suppressed small. For this reason, even if the data size of print information corresponding to all print target pages exceeds the buffer capacity of the MFP 100, the MFP 100 can receive it.

Note that print information used to acquire print data of each page and "information about next print information" used to acquire next print information can be described in different formats or in a common format such as URL (Uniform Resource Locator). When print information and "information about next print information" are described in a common format, the MFP 100 can acquire these pieces of information by the same processing without performing different processes for the respective pieces of information.

In the example of FIG. 4, information of print data of one page is included in one piece of print information (903/904/999). However, information of print data of one page may be included in two or more pieces of print information. Detailed examples of individual print information will be described later with reference to FIG. 8.

Processing of causing the MFP 100 to receive print data based on print information will be described next.

The MFP 100 first identifies location information of print information and receives the print information from the print data conversion server 300. The MFP 100 then acquires print data from the print data conversion server 300 via, for example, the job server 200 in accordance with the location information of the print data included in the print information.

At this time, one or a plurality of pieces of print information are generated in accordance with, for example, the storage capacity to store print information in the MFP 100 so that each print information has a size holdable by the buffer of the MFP 100. For this reason, even if the data size of print information corresponding to all print target pages exceeds the storage capacity, the MFP 100 can acquire the print information. When a plurality of pieces of print information are divisionally generated, each print information includes information about another print information except print information including information about the last page when executing printing. For this reason, upon receiving such print information, the MFP 100 can recognize that the print information is followed by another print information. Hence, for example, after acquiring all print data corresponding to one piece of print information, the MFP 100 can acquire next print information and then acquire print data of following pages.

The MFP 100 does not execute another print processing until print processing of print data corresponding to print information including no other print information is completed. That is, execution of another print processing is prohibited until print processing corresponding to all print target pages is completed, thereby preventing the other print processing from interrupting during print processing of one print target data.

Figure 5:
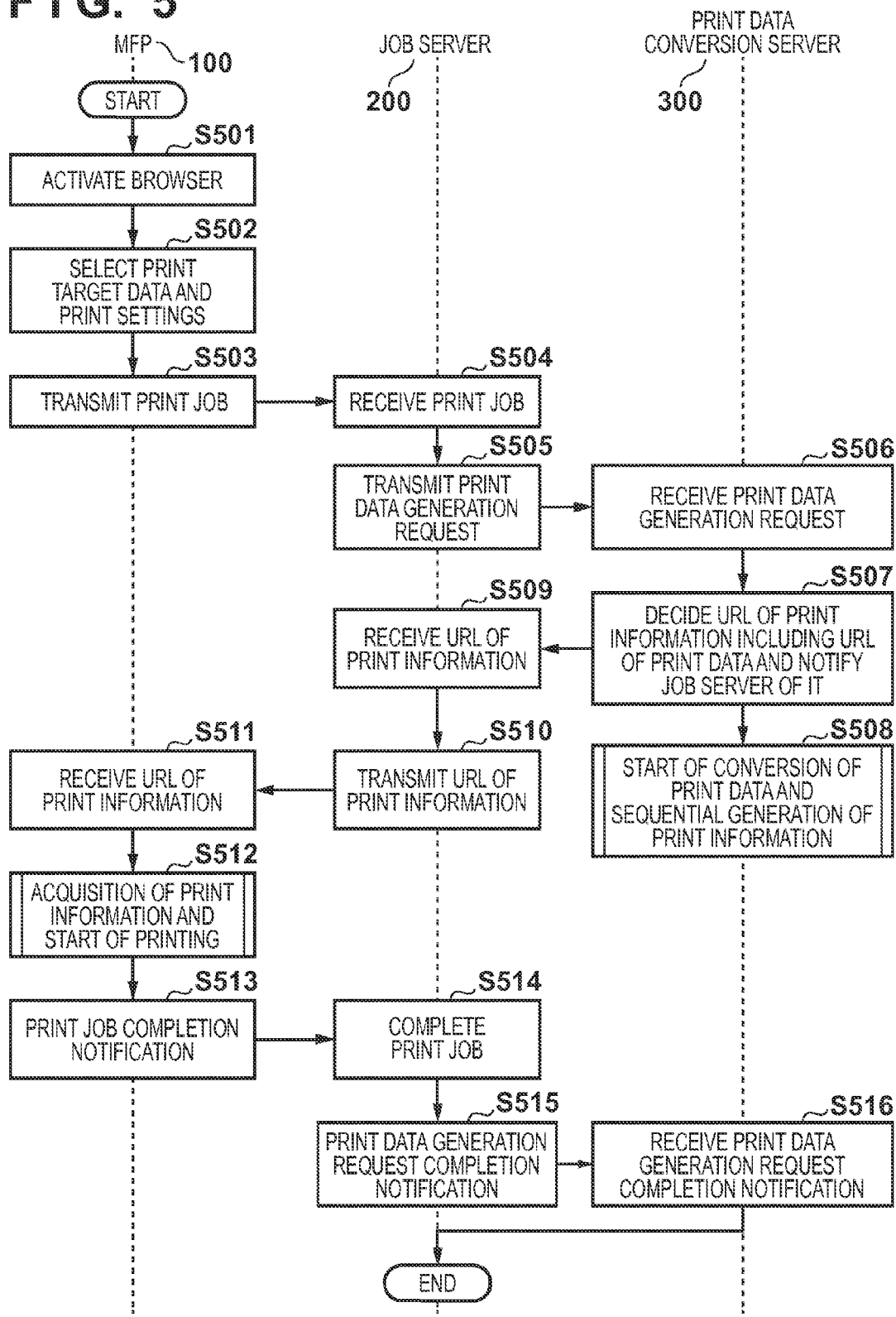
FIG. 5 is a sequence chart showing the outline of processing to be executed by the print system.

Detailed examples of processes to be executed by the MFP 100, the job server 200, and the print data conversion server 300 will be described below in detail with reference to FIGS. 5 to 7. FIG. 5 is a sequence chart showing the outline of processing to be executed by the print system.

Figure 6:
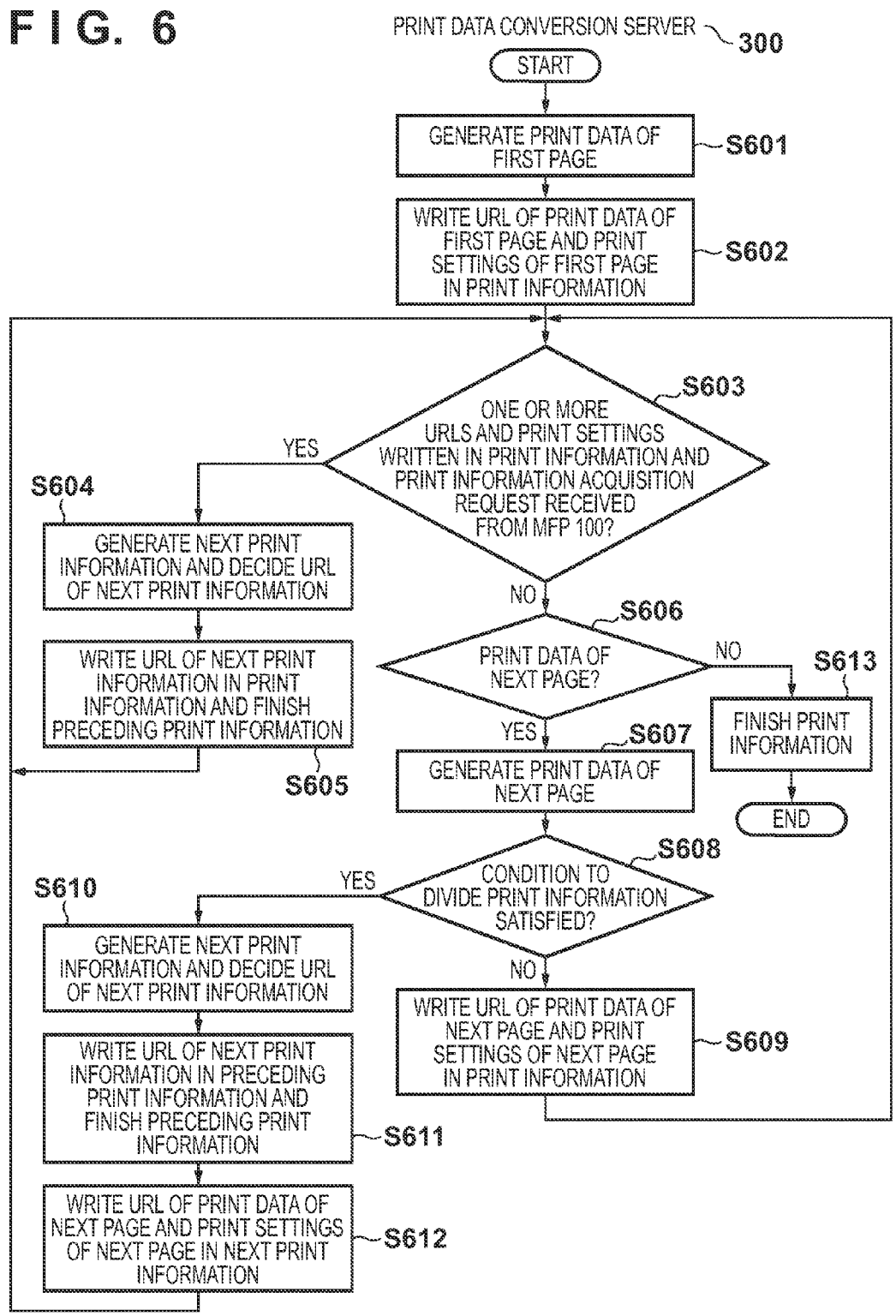
FIG. 6 is a flowchart showing an operation example of data conversion processing and print information generation processing.

Note that programs corresponding to the processes of the MFP 100 and the job server 200/print data conversion server 300 in FIGS. 5 to 7 are stored in the ROMs 102 and 202, respectively. The CPUs 101 and 201 read out the programs to the RAMs 103 and 203 and execute them, thereby implementing the processes shown in FIGS. 5 to 7.

In the processing shown in FIG. 5, the user first operates the display operation unit 108 of the MFP 100 and activates a browser that operates on the MFP 100 (step S501). The browser communicates with the application server (not shown) using the default account, and operates various kinds of web applications on the browser. At this time, since the browser automatically performs authentication with the application server using the default account, the user need not input the default account on the browser.

Next, for example, the user selects and activates a web application on the browser, selects print target data such as an image or a document, and selects print settings such as the size of paper to print, paper type, number of copies, quality, and double-sided printing (step S502). After that, the URL of print target data and print settings selected in step S502 are put together to generate a print job, the printer to execute print processing is set to the MFP 100, and the print job is transmitted to the job server 200 (step S503). At this time, since the default account is used, the print target printer can be identified as the MFP 100 without user designation of the printer to execute print processing.

As the browser operating on the MFP 100 and the web application operating on the browser in steps S501 to S503, those associated with general web technologies are used, and a description thereof will be omitted. In steps S501 to S503, the browser on the MFP 100 operates. However, the present invention is not limited to this. For example, the print job may be transmitted to the job server 200 using a browser operating on a PC or smartphone. In this case, since the browser operates on an apparatus other than the MFP 100, the default account cannot be used. For this reason, in this case, for example, a user account to separately identify the user is used. In this case, when creating the user account, the user account and the MFP 100 are associated. When the user inputs the user account on the browser operating on the PC or smartphone to perform authentication with the application server, various kinds of web applications can be operated on the browser of another apparatus to cause the MFP 100 to execute print processing. More specifically, various kinds of web applications operating on the browser of another apparatus can set the print target printer to the MFP 100 and transmit the print job to the job server 200.

Next, the job server 200 receives the print job from the MFP 100 (step S504). The job server 200 issues a print data generation request to the print data conversion server 300 (step S505). At this time, the job server 200 includes, in the print data generation request, the print settings and the URL of the print target data included in the print job received from the MFP 100 as well together. The print data generation request is done to obtain print data suitable for the MFP 100 because the format of print data to be generated changes depending on the performance (for example, printable file format and resolution) of the MFP 100 and original data (for example, photo or document) to be printed.

The print data conversion server 300 receives the print data generation request from the job server 200 (step S506). Next, for the job server 200, the print data conversion server 300 generates print information including location information about where print data of each page when executing printing exists in the print data conversion server 300 (step S507). Note that in the print information, for example, one or a plurality of pieces of information about the location of print data are described by URLs, URIs, or the like. Note that the information about the location of print data such as a URL or URI included in the print information is effective temporarily only during the time until, for example, printing progresses, and the print information is deleted. Note that the print information may be generated in step S507 or before step S602 of FIG. 6 (to be described later). The print information to be generated will be described later with reference to FIG. 8. Next, the print data conversion server 300 starts converting print target data into print data and sequentially generates print information (step S508). Details of processing to be executed in step S508 will be described later with reference to FIG. 6.

Next, the job server 200 receives the information (for example, URL) about the location of print information from the print data conversion server 300 (step S509). The job server 200 then transmits the URL of print information to the MFP 100 of the print target (step S510).

Note that in this embodiment, when the print target includes a plurality of pages, the plurality of pages are sometimes divided into a plurality of groups, and print information is generated for each of the divided groups, as described above with reference to FIG. 4. In this case, in step S510, print information corresponding to each of the plurality of groups is sequentially transmitted to the MFP 100. At this time, the job server 200 may sequentially receive print information corresponding to each of the plurality of groups in step S509 and sequentially transmit the print information in step S510. Alternatively, the job server 200 may receive all pieces of print information corresponding to the plurality of groups in step S509 and sequentially perform transmission processing in step S510.

The MFP 100 receives the URL as the information about the location of print information from the job server 200 (step S511). Upon receiving and acquiring the URL, the MFP 100 prohibits another print processing (for example, printing from a PC (not shown) connected to the MFP 100 via a USB interface) that is inexecutable at the same time as the series of print processes at the start of the series of print processes. After that, the MFP 100 acquires print information using the URL associated with the received print information and starts printing (step S512). Processing to be executed in step S512 will be described later with reference to FIG. 7.

When all print processes are completed, the MFP 100 issues a print job completion notification to the job server 200 (step S513). Since the series of print processes is completed, the MFP 100 then permits the other prohibited print processing (for example, printing from a PC (not shown) connected to the MFP 100 via a USB interface) that is inexecutable at the same time as the series of print processes.

The job server 200 receives the printing completion notification from the MFP 100 and completes the print job received in step S504 (step S514). The job server 200 issues a print data generation request completion notification to the print data conversion server 300 (step S515). Finally, the print data conversion server 300 receives the print data generation request completion notification from the job server 200, and completes the print data generation request received in step S506 (step S516).

(Data Conversion Processing and Print Information Generation Processing)

FIG. 6 is a flowchart showing an operation example of data conversion processing and print information generation processing to be executed by the print data conversion server 300 in step S508 of FIG. 5. First, the print data conversion server 300 generates print data to be printed as the first page when printing print target data (step S601). For example, the print data conversion server 300 acquires print target data from the URL associated with the print target data, which is included in the print data generation request acquired in step S506. The print data conversion server 300 converts the print target data into print data having a format printable by the MFP 100, and temporarily stores the print data in a storage unit such as the internal storage device 204 or the external storage device 205. The print data conversion server 300 also decides information such as a URL or URI as information used to identify the location of the print data.

Next, the print data conversion server 300 writes, in the print information, the URL associated with the print data of the first page generated in step S601 and the print settings included in the print data generation request acquired in step S506 (step S602). The print information is temporarily stored in a storage unit such as the internal storage device 204 or the external storage device 205. After that, the print data conversion server 300 determines whether one or more URLs and print settings have been written in the print information, and a print information acquisition request has been received from the MFP 100 (step S603). If one or more URLs and print settings have been written, and a print information acquisition request has been received from the MFP 100 (YES in step S603), the process advances to step S604. On the other hand, in at least one of a case where one or more URLs and print settings have not been written or a case where no print information acquisition request has been received from the MFP 100 (NO in step S603), the process advances to step S606.

In step S604, the print data conversion server 300 generates next print information including information about print data of the next page, and decides information such as a URL or URI used to identify the location of the generated print information. After that, the print data conversion server 300 writes the URL associated with the next print information, which has been generated in step S604, in the print information currently under generation, and finishes the print information (step S605). When the print information is finished, it can be transmitted to the MFP 100 in step S704 of FIG. 7 (to be described later). In this way, when a print information acquisition request has been received from the MFP 100, and one or more pieces of information such as URLs about print data have been written, the print information is immediately finished and transmitted to the MFP 100, thereby starting print processing without making the MFP 100 wait. After the print information is finished, the process returns to step S603.

In step S606, the print data conversion server 300 confirms the print data generation request acquired in step S506, and determines whether there exists print data of the next page. That is, the print data conversion server 300 determines whether the print target data includes unconverted data following the already converted data. If unconverted data exists, the print data conversion server 300 determines that print data of the next page exists. If no unconverted data exists, the print data conversion server 300 determines that no print data of the next page exists. If print data of the next page exists, the process advances to step S607. On the other hand, if no print data of the next page exists, the process advances to step S613. In step S613, since no print data of the next page exists, the print information is finished. When the print information is finished, it can be transmitted to the MFP 100 in step S704 of FIG. 7 (to be described later).

In step S607, the same processing as in step S601 is executed for print data of the next page. At this time, the print data conversion server 300 may determine whether print data previously converted and temporarily stored is already acquired by the MFP 100 in step S707 (to be described later). If the print data is not acquired, the print data conversion server 300 may temporarily stop the conversion processing. The print data conversion server 300 is prevented from temporarily storing a plurality of print data, thereby decreasing the storage capacity of the print data conversion server 300. The conversion processing may temporarily be stopped until the MFP 100 acquires in step S701 (to be described later) the new print information generated in step S604 or S610 (to be described later). Until the new print information is acquired, the print data conversion server 300 is prohibited from temporarily storing the converted print data necessary for the file, thereby decreasing the storage capacity of the print data conversion server 300.

Next, the print data conversion server 300 determines whether a condition to divide print information is satisfied (step S608). That is, the print information currently under generation is finished without including information of the next print data, and it is determined whether to start generating another print information including the information of the next print data. Note that although the term "division" is used for the descriptive convenience, "division" here does not indicate dividing already finished print information but includes starting newly generating print information different from the print information currently under generation. When the condition to divide print information is satisfied, the process advances to step S610. When the condition to divide is not satisfied, the process advances to step S609.

A condition to divide print information is, for example, that the file size of print information becomes larger than a predetermined size. This is a case where the size of print information exceeds the predetermined size when information about print data of the next page is included. In this case, information about print data of the next page is included in next print information so the size of print information does not exceed the predetermined size. In this case, a plurality of pieces of print information each of which is smaller than the predetermined size are generated. When the predetermined size is set to be equal to or smaller than the capacity storable by the MFP 100, the MFP 100 can receive the print information. Note that the MFP 100 may decide the predetermined size and notify the print data conversion server 300 of it, or notify the print data conversion server 300 of information of the capacity capable of storing the print information. This notification may be included in the print data generation request in step S506. When, for example, acquiring the information of the storage capacity, the print data conversion server 300 may decide the predetermined size not to exceed the storage capacity. The print data conversion server 300 may hold the information of the predetermined size as a fixed value. The job server 200 may decide the predetermined size and notify the print data conversion server 300 of it.

Another condition to divide print information is, for example, that the number of pages of print data corresponding to information included in print information exceeds a predetermined number of pages. For example, assume that print information currently under generation includes information about print data of three pages. In this case, if information about next print data is included, the number of pages of print data corresponding to the information included in this print information becomes "4". When the predetermined number of pages is "3", the number of pages of print data corresponding to the information included in the print information exceeds the predetermined number of pages. For this reason, the print data conversion server 300 starts generating another print information without including the information about print data of the next page in the print information currently under generation, and includes the information about print data of the next page in the other print information. In this case, a plurality of pieces of print information each including information about print data of pages in number smaller than the predetermined number of pages are generated.

When the predetermined number of pages is adjusted in accordance with the capacity storable by the MFP 100, the MFP 100 can receive any of the plurality of pieces of print information. Note that the MFP 100 may decide the predetermined number of pages and notify the print data conversion server 300 of it. This notification may be included in the print data generation request in step S506. The print data conversion server 300 may hold the information of the predetermined number of pages as a fixed value. The job server 200 may decide the predetermined number of pages and notify the print data conversion server 300 of it.

Still another condition to divide print information is, for example, that a predetermined time has elapsed from the start of generation of print information without completing generation of the print information. According to this, one piece of print information is finished before the elapse of the predetermined time from the start of generation of the print information. When, for example, the MFP 100 issues the print data generation request at a predetermined period, the print data conversion server 300 finishes print information based on the elapse of a predetermined time such that one piece of print information is finished at the issuance timing of the print data generation request. Note that the MFP 100 may decide the predetermined time to complete generation of print information and notify the print data conversion server 300 of it. For example, the MFP 100 may notify the print data conversion server 300 of the information of the above-described period. This notification may be included in the print data generation request in step S506. Upon acquiring the information of the period, the print data conversion server 300 may decide the predetermined time based on the period. The print data conversion server 300 may hold the information of the predetermined time as a fixed value. The job server 200 may decide the predetermined time and notify the print data conversion server 300 of it.

In step S609, the print data conversion server 300 writes information about print data of the next page in the print information by the same processing as in step S602. After that, the process returns to step S603. On the other hand, in step S610, the print data conversion server 300 generates next print information including information about print data of the next page, and decides location information such as a URL or URI associated with the generated print information by the same processing as in step S604. The print data conversion server 300 writes the URL associated with the next print information generated in step S610 in the print information currently under generation and finishes the print information (step S611). Upon receiving a print information acquisition request from the MFP 100 next time, the print data conversion server 300 transmits the finished print information to the MFP 100. Next, the print data conversion server 300 writes information about print data of the next page in print information that the server has newly started generating (step S612). After that, the process returns to step S603.

In the above-described way, the print data conversion server 300 generates one or a plurality of pieces of print information receivable by the MFP 100 and also generates print data in a format printable by the MFP 100. When generating a plurality of pieces of print information, information about next print information including information about print data of the next page is included in each print information. This makes it possible to prevent the print information from becoming too large to be received by the MFP 100 and also notify the MFP 100 that print information about following pages separately exists.

(Print Processing)

FIG. 7 is a sequence chart showing an operation example of print processing to be executed in step S512 of FIG. 5. Note that FIG. 5 shows that the processing of step S512 is executed by the MFP 100 alone. However, print processing includes data transmission/reception between the MFP 100 and the print data conversion server 300, as shown in FIG. 7. More specifically, the MFP 100 transmits a print information or print data acquisition request to the print data conversion server 300, and the print data conversion server 300 transmits print information or print data to the MFP 100 in response to the acquisition request.

When print processing starts, the MFP 100 identifies the location of print information using the URL acquired in step S511, and transmits a print information acquisition request to the print data conversion server 300 (step S701). The print data conversion server 300 determines whether preparation of the requested print information is completed (step S702). If preparation is not completed (NO in step S702), the print data conversion server 300 waits for a predetermined period (step S703) until preparation of print information is completed.

If preparation is completed (YES in step S702), the print data conversion server 300 transmits the requested print information to the MFP 100 (step S704). At this time, if print information older than the requested print information exists, or print information corresponding to a page before the page of print data corresponding to the requested print information exists, the print data conversion server 300 may delete the print information. The storage capacity of the print data conversion server 300 can be saved by deleting unnecessary print information. The MFP 100 analyzes the acquired print information, and determines whether the print information includes a URL that identifies the location of unprinted print data (step S705).

If a URL associated with unprinted print data is included (YES in step S705), the MFP 100 issues an acquisition request of the unprinted print data to the print data conversion server 300 using the URL (step S706). The print data conversion server 300 transmits the requested print data to the MFP 100 in response to the acquisition request (step S707). At this time, if already transmitted print data older than the requested print data exists, the print data conversion server 300 may delete the print data, as in step S704. The storage capacity of the print data conversion server 300 can be saved by deleting unnecessary print data. Next, the MFP 100 executes print processing of the print data received and acquired from the print data conversion server 300 using the print control unit 112 and the print unit 113. After that, the process returns to step S705.

On the other hand, if no URL associated with unprinted print data is included (NO in step S705), the MFP 100 analyzes the acquired print information, and determines whether the print information includes a URL associated with next print information (step S709). If the print information includes a URL associated with next print information (YES in step S709), the process returns to step S701, and the processes of steps S701 to S708 are executed again. On the other hand, if the print information includes no URL associated with next print information (NO in step S709), the print processing is completed.

As described above, the MFP 100 can determine, based on whether print information includes another print information, whether print processing will be complete only with the print information or a series of print processes including another print information should be executed. In addition, since the print information is divisionally acquired a plurality of times, the MFP can be prevented from becoming unable to hold print information having a large size. For this reason, even when print target data is large, and the number of pages after printing is enormous, the MFP 100 can cope with this and execute a series of print processes.

Furthermore, when both location information of print data and that of next print information are described by URLs, the MFP 100 can acquire the two types of information by a common acquisition method without using data acquisition methods to individually cope with them.

(Example of Print Information)

The structure of print information will be described at last. FIG. 8 illustrates an example of print information generated by the print data conversion server 300. The print information of this example includes piece of information (801/802/803 to be described later) about print data of three pages, and information (804 to be described later) about next print information.

When print information is finished in step S605 or S611 of FIG. 6, the print information includes information about print data and information about next print information, like the print information shown in FIG. 8 or like, for example, the print information 903 and 904 shown in FIG. 4. On the other hand, when print information is finished in step S613 of FIG. 6, print information that does not include information (804 to be described later) about next print information but includes only information (801/802/803 to be described later) about print data is generated, like, for example, the print information 999 shown in FIG. 4.

Referring to FIG. 8, reference numeral 801 denotes information about print data of the first page. This information includes paper size (A4), paper type (plain), and number of copies (1) as print settings. This information also includes the URL (http://www.XXX.com/YYY_1pagefront.jpg) and file size (44444) of print data on the front side of the first page. Since the information 801 includes no information about the back side, only the front side is printed. Reference numeral 802 denotes information about print data of the second page. Since the information 802 includes no information about the back side, like the information 801, only the front side is printed.

Reference numeral 803 denotes information about print data of the third page. This information includes the URL (http://www.XXX.com/YYY_3pagefront.jpg) and file size (33333) of print data on the front side of the third page. This information also includes the URL (http://www.XXX.com/YYY_3pageback.jpg) and file size (77777) of print data on the back side. Hence, double-sided printing is performed for the third page.

Reference numeral 804 denotes information about next print information. This information includes a URL (http://www.XXX.com/YYY_2contentslist.xml) that identifies the location of the next print information and its file size (2222).

Note that FIG. 8 shows an example of print information including information about three print data. However, the present invention is not limited to this. That is, print information including information about at least one print data suffices. For example, when a print information acquisition request is received from the MFP 100 in step S603 of FIG. 6 after information about one print data is written, print information including one information about the print data and information about next print information is generated in step S605.

The MFP 100 analyzes print information and determines that information about print data of the first page is included in step S705 of FIG. 7, and executes the processes of steps S706 to S708, thereby executing printing of the first page. Next, the MFP 100 analyzes print information again and determines that information about print data of the second page is included in step S705, and executes the processes of steps S706 to S708, thereby executing printing of the second page. Next, the MFP 100 analyzes print information again and determines that information about print data of the front side of the third page is included in step S705, and then executes the processes of steps S706 to S708, thereby executing printing of the front side of the third page. Furthermore, the MFP 100 analyzes print information again and determines that information about print data of the back side of the third page is included in step S705, and then executes the processes of steps S706 to S708, thereby executing printing of the back side of the third page. After that, the MFP 100 analyzes print information again and determines that no URL of print data is included in step S705. The MFP 100 then determines in step S709 that the URL of next print information exists, and returns the process to step S701 to continue the print processing.

Note that a tag "<next_contentslist>" is described for the URL of the next print information, as shown in FIG. 8. By referring to this description, the MFP 100 can recognize that the URL is not location information of print data but location information about next print information.

However, the method used by the MFP 100 for the recognition is not limited to this. For example, which one of the two types of information is indicated by the URL may be determined depending on whether the file identifier in the URL is ".jpg" or ".xml". The file identifier ".jpg" of the print target is merely an example. Various files can be print targets, and identifiers corresponding to the various files are described in a URL serving as the location information of print target data.

As described above, when job information is divisionally controlled by both the server and the MFP, printing without a limitation on the number of pages or copies can be performed even if the MFP has only a limited buffer capacity. More specifically, even when the buffer capacity for print information is limited, the MFP can process an enormous amount of print data by a series of print processes because print information having a size storable by the buffer capacity is generated and linked to another print information. Since print data is acquired on a page basis, the MFP can sequentially acquire print data and execute print processing even when the capacity of print data is limited. In addition, the MFP can start printing before generation of all pieces of job information is completed in the server. Furthermore, since the server need not hold print data of all pages, the storage capacity to be prepared can be decreased.

Print information generated by the above-described method includes another print information corresponding to a page following a page corresponding to the print information so as to acquire next print information in the page order. Hence, the page order of printing is output as intended by the user. When another print information corresponding to the next page is included, the MFP can determine that a series of print processes is not completed yet. This can prevent interrupt by another function (for example, printing by a local PC).

Note that in the above-described embodiment, an example has been described in which the MFP 100 receives print target data in accordance with location information included in print information and prints the data. However, the present invention is not limited to this, and various apparatuses such as a PC, smartphone, and camera may receive data. In this case, various kinds of processing such as display, storage in a memory, and transmission to an external apparatus can be applied as predetermined processing for the received data. For example, when a smartphone displays an image received from a server, the server may transmit the location information of the image to the smartphone, and the smartphone may receive the image in accordance with the location information. In this case, the server may transmit location information corresponding to each of a plurality of images to the smartphone. At this time, the data size of the location information corresponding to all display target images may exceed a predetermined buffer capacity of the smartphone, as described in the above embodiment. When the location information is divided, and each divided location information and location information used to acquire next location information are transmitted to the smartphone, as described in this embodiment, the smartphone can appropriately acquire the display target images.

When implementing the functions of the embodiment by program codes, the program codes can be executed by one computer (CPU or MPU) or by a plurality of computers cooperatively. The program codes may be executed by a computer, or hardware such as circuits configured to implement the functions of the program codes may be provided. Some of the program codes may be implemented by hardware, and the remaining parts may be executed by a computer.

According to the present invention, even when the buffer capacity of the processing apparatus is small, process target data can appropriately be processed.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-167846 filed on Aug. 12, 2013, which is hereby incorporated by reference herein in its entirety.

What is claimed is:

1. An information processing system, comprising one or more servers and a processing apparatus,
wherein the one or more servers comprises:
a generation unit configured to generate a first piece of first location information indicating a location of a first part of data as a target of predetermined processing and second location information indicating a location of a second piece of first location information corresponding to a second part of the data, wherein the first location information and the second location information have a common format; and
a transmission unit configured to transmit the first piece of first location information and the second location information generated by said generation unit to the processing apparatus; and
wherein the processing apparatus comprises:
an acquisition unit configured to acquire the first part by analyzing the first piece of first location information transmitted by said transmission unit, and acquire the second piece of first location information corresponding to the second part by analyzing the second location information transmitted by said transmission unit, and acquire the second part by analyzing the second piece of first location information acquired from the second location information; and
an execution unit configured to execute the predetermined processing for the first part and the second part acquired by said acquisition unit.

2. The system according to claim 1, wherein said generation unit generates a file including the first piece of first location information and the second location information, and said transmission unit transmits the generated file.

3. The system according to claim 1, wherein said generation unit generates the second location information in a case where a predetermined condition associated with the first piece of first location information is satisfied.

4. The system according to claim 3, wherein in a case where the generation unit generates a plurality of pieces of first location information indicating the location of data, the predetermined condition is set as a condition based on a fact that a piece of first location information that has not been transmitted yet by said transmission unit exists out of the plurality of pieces of first location information, and the generation unit generates the second location information in a case where the condition is satisfied.

5. The system according to claim 3, wherein the predetermined condition is set as a condition based on a fact that a size of the first location information is larger than a predetermined size, and the generation unit generates the second location information in a case where the condition is satisfied.

6. The system according to claim 5, the one or more servers further comprising an obtaining unit configured to obtain information used to identify the predetermined size from the processing apparatus, wherein said generation unit generates the second location information in a case where the predetermined condition based on the predetermined size identified by the information obtained by said obtaining unit is satisfied.

7. The system according to claim 3, wherein the predetermined condition is set as a condition based on a fact that said generation unit has not completed generation of the first location information in a case where an acquisition request of the first location information is received from the processing apparatus, and the generation unit generates the second location information in a case where the condition is satisfied.

8. The system according to claim 1, wherein the predetermined processing is printing by a print apparatus serving as the processing apparatus, and
the first location information indicates a location of print data corresponding to some of a plurality of pages of a print target of the print apparatus.

9. The system according to claim 8, the one or more servers further comprising a conversion unit configured to convert data of the print target into the print data.

10. The system according to claim 9, the one or more servers further comprising a determination unit configured to determine whether the print data identified by the first location information generated by said generation unit has been transmitted to the processing apparatus,
wherein said conversion unit executes the conversion of data corresponding to the second part in accordance with determination by said determination unit that the print data corresponding to the first part has been transmitted to the processing apparatus.

11. The system according to claim 9, wherein said conversion unit executes the conversion of the data of the first or second part in accordance with reception of the acquisition request of the first location information corresponding to the data of the first or second part from the print apparatus.

12. The system according to claim 8, wherein said generation unit generates information of a print setting in addition to the information indicating the location of the print data.

13. The system according to claim 8, wherein said generation unit generates the second information in a case where a number of the plurality of pages of the print target is larger than a predetermined number.

14. The system according to claim 1, wherein said execution unit does not execute another predetermined processing different from the predetermined processing for the data until the predetermined processing for the data is completed.

15. The system according to claim 1, wherein said acquisition unit executes the acquisition of the first part, the second piece of first location information corresponding to the second part, and the second part by performing common processing corresponding to the common format.

16. The system according to claim 1, wherein the common format is URL.

17. The system according to claim 1, wherein the one or more servers include a first server comprising said generation unit and a second server comprising said transmission unit.

18. An information processing method executed by one or more servers and a processing apparatus, comprising:
generating, by the one or more servers, a first piece of first location information indicating a location of a first part of data as a target of predetermined processing and second location information indicating a location of a second piece of first location information corresponding to a second part of the data, wherein the first location information and the second location information have a common format; and
transmitting, by the one or more servers, the first piece of first location information and the second location information generated in the generating to the processing apparatus;
acquiring, by the processing apparatus, the first part by analyzing the first piece of first location information transmitted in the transmitting;
executing, by the processing apparatus, the predetermined processing for the first part;
acquiring, by the processing apparatus, the second piece of first location information corresponding to the second part by analyzing the second location information transmitted in the transmitting;
acquiring, by the processing apparatus, the second part by analyzing the second piece of first location information acquired from the second location information; and
executing, by the processing apparatus, the predetermined processing for the second part.

* * * * *